United States Patent
Bass et al.

(10) Patent No.: US 9,251,108 B2
(45) Date of Patent: Feb. 2, 2016

(54) MANAGING ACCESS TO SHARED BUFFER RESOURCES

(71) Applicant: International Business Machines Corporation, Armonk, NY (US)

(72) Inventors: Brian Mitchell Bass, Apex, NC (US); Kenneth Anthony Lauricella, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 13/668,527

(22) Filed: Nov. 5, 2012

(65) Prior Publication Data

US 2014/0129749 A1 May 8, 2014

(51) Int. Cl.
| | |
|---|---|
| *G06F 13/00* | (2006.01) |
| *G06F 13/40* | (2006.01) |
| *G06F 13/364* | (2006.01) |
| *G06F 13/16* | (2006.01) |
| *G06F 13/37* | (2006.01) |

(52) U.S. Cl.
CPC ........ *G06F 13/4031* (2013.01); *G06F 13/1663* (2013.01); *G06F 13/364* (2013.01); *G06F 13/37* (2013.01)

(58) Field of Classification Search
CPC ............ H04L 47/10; H04L 13/28; H04L 5/12
USPC ........................ 710/111, 52–57, 29
See application file for complete search history.

(56) References Cited

U.S. PATENT DOCUMENTS

| | | | | |
|---|---|---|---|---|
| 5,671,371 | A * | 9/1997 | Kondo et al. ................. | 710/311 |
| 6,728,256 | B1 * | 4/2004 | Henrion ........................ | 370/429 |
| 6,877,048 | B2 * | 4/2005 | Bilak et al. ..................... | 710/52 |
| 7,213,087 | B1 | 5/2007 | Bertone et al. | |
| 7,647,435 | B2 | 1/2010 | Check et al. | |
| 7,882,278 | B2 | 2/2011 | Chadha et al. | |
| 2004/0123010 | A1 * | 6/2004 | Moyer ......................... | 710/305 |
| 2005/0076166 | A1 * | 4/2005 | Shearer ......................... | 710/52 |
| 2006/0174050 | A1 * | 8/2006 | Chadha et al. ................ | 710/310 |
| 2009/0006689 | A1 * | 1/2009 | Lubbers et al. ................ | 710/112 |
| 2009/0019193 | A1 * | 1/2009 | Luk ................................ | 710/52 |
| 2010/0268852 | A1 * | 10/2010 | Archer et al. .................. | 710/22 |
| 2013/0282933 | A1 * | 10/2013 | Jokinen et al. ................. | 710/22 |
| 2014/0250246 | A1 * | 9/2014 | Solomon et al. ............... | 710/52 |

* cited by examiner

*Primary Examiner* — Raymond Phan
(74) *Attorney, Agent, or Firm* — L. Jeffrey Kelly; Steven Meyers

(57) ABSTRACT

A structure and method of allocating read buffers among multiple bus agents requesting read access in a multi-processor computer system. The number of outstanding reads a requestor may have based on the current function it is executing is dynamically limited, instead of based on local buffer space available or a fixed allocation, which improves the overall bandwidth of the requestors sharing the buffers. A requesting bus agent may control when read data may be returned from shared buffers to minimize the amount of local buffer space allocated for each requesting agent, while maintaining high bandwidth output for local buffers. Requests can be made for virtual buffers by oversubscribing the physical buffers and controlling the return of read data to the buffers.

19 Claims, 6 Drawing Sheets

MANAGING ACCESS TO SHARED BUFFER RESOURCES

BACKGROUND

1. Field of the Invention

The embodiments herein relate to management of shared buffer resources in multi-processor computer systems, and more specifically, to a system and method for dynamically limiting the number of outstanding requests for read data a requesting processor or bus agent may accumulate based on the current function it is executing, instead of based on local buffer space available or a fixed allocation.

2. Description of the Related Art

In computer systems and networks, buffers are a convenient means of storing commands, requests and data in transit from one location to another. Buffers are used in a variety of applications, including handling flow control for SMP and switch fabric systems. Buffers may also be used in memory and data allocation, such as a read/write request buffer to manage read and write access operations between multiple sources. Common drawbacks of systems utilizing shared buffers space is contention among several bus agents for the same shared resource and attending congestion issues as well as domination of shared buffers by a high bandwidth process.

In computer systems employing multiple processor cores, it is advantageous to employ hardware accelerator coprocessors to meet throughput requirements for specific applications. Coprocessors utilized for hardware acceleration transfer address and data block information via a bridge. The main system bus then connects the bridge to other nodes that are connected to a main memory and individual processor cores that typically have local dedicated cache memories.

Hardware accelerator engines or coprocessors utilized in multi-processor systems have bandwidth requirements associated with the particular function being executed. Accordingly, the number of memory access operations of one hardware accelerator engine may be substantially greater or less than the coprocessing function of a neighboring hardware accelerator engine necessitating a commensurately larger or lesser use of available buffer address space.

To prevent data loss, a multiprocessor system should not transfer data, commands or requests to a buffer when no space is available because the data will likely need to be resent thereby further taxing system bandwidth. Access to buffer address space must also be allocated fairly to ensure a lower bandwidth process is not completely ignored. Equal access is usually unnecessary because some processes will be able to reliably execute with much lower access than a high bandwidth process. Priority access can be assigned to higher bandwidth processes, but the system still needs a way to prevent total dominance of one processor or bus agent over buffer resources so that processes with lower bandwidth requirements will not stall.

Prior solutions to the problem of efficient buffer allocation include dedicated partitioning of buffers to a specific application or process. For example, if a buffer has sixteen word-lines and is shared among four data channels or applications, each channel might be allocated four buffer wordlines. While fair, this allocation scheme may be inefficient for bursty traffic from a single channel because the high bandwidth channel would not be able to use other buffer locations, even if idle, due to the fixed nature of the allocation.

Another solution to buffer allocation is stop and go commands issued by the buffer to the data channels it services. The buffer manages its resources by signaling when new data may be accepted or when space is reduced. During periods of low volume traffic, each channel receives a "go" signal indicating that space is available and a "stop" signal when space becomes limited to anticipate an overflow condition. This approach offers better utilization of overall buffer space because users are not limited to a fixed allocation of space. However, there is risk with this approach too, as the latency between when the buffer sends out a stop command and the user receives and responds to the command, may present a situation where data is still being sent to a buffer near peak capacity, thereby resulting in an overflow and loss of data. To prevent this situation, stop commands are sent well in advance of the buffer filling to capacity. Consequently, if all senders are bursting data to the buffer, the stop command will be timed to prevent data from being sent to the buffers prior to reaching full capacity. The downside of sending early stop commands is the maximum capacity of the buffers will not be utilized during peak traffic volumes, but an overflow condition is nonetheless avoided.

In any distributed or multi-processor computer system, data and address paths must be provided by a system bus to interconnect the various components of the system. Buses may be internal to a single IC or external board-based interconnect structures. The volume of data traversing the bus as well as the physical length of the bus and the types of devices connected will present a number of design constraints. Because different types of devices have varying levels of throughput capability and latency, the bus must provide a mechanism for flow control to prevent devices from being overwhelmed if not ready to receive data or incapable of receiving data at the rate sent.

A known solution to flow control is a credit based approach in which a sending device receives an allocation of credits to transmit data on the bus. The allotment of credits may represent the capacity of the buffer at a receiving device. When a sender transmits data on the bus its allocation of credits is decremented. When the receiver restores the capacity to receive additional data, it returns the credit to the sender. This approach eliminates the problem of potentially having data in flight to a receiver for which the buffer does not have sufficient capacity and allows the sender to transmit data immediately rather than waiting for permission from the receiver. If the sender exhausts its supply of credits it is temporarily disabled from sending data on the bus.

Credit based flow control requires the sender to maintain a local record of the number of credits available, which is continuously updated as data is sent out on the bus. Credits are typically returned by the receiver as a single pulse or by periodic updates from the receiver. At times a discrepancy may arise between the local record maintained by the sender and actual credits available at the receiver due to conflicts with other bus agents, which is described as a "credit loss."

The bus agents of a multiprocessor system may be distributed over physically remote subsystems and nodes that are interconnected by a switch fabric. Such modular systems may be further configured to accommodate or compensate for the distributed nature of shared memory. Symmetric Multiprocessing (SMP) systems often require the bus agents to pass data packets to the different nodes of the switch fabric. To increase the efficiency of the system, data packets are grouped together and mapped to virtual channels, which requires extensive use of buffers to hold various elements of disparate bus transactions.

Virtual channels must have independent flow control constraints for bus transactions sharing common interface and buffering resources and are therefore used to separate traffic over a common set of physical links.

Accordingly, there exists a need in the art to overcome the deficiencies and limitations described hereinabove.

SUMMARY

In view of the foregoing, disclosed herein are embodiments related to managing shared storage buffer resources in a multi-processor computer system. In the embodiments, hardware acceleration engines are coupled to direct memory access (DMA) channels incorporating local memory buffers, which hold data needed to execute processing functions by the hardware acceleration engines. Programmable limits are set in the DMA channels for the number of read access requests available for any single hardware acceleration engine type. The allowable range is between 1 and m, where m is the total amount of buffer space in the local read buffers for a requesting bus agent. Hardware acceleration engines having high bandwidth requirements are allocated a greater percentage of total buffer space, while lower bandwidth acceleration engines will utilize a lower available buffer capacity. Once the programmed limit has been reached, if more read data needs to be fetched, the requesting DMA channel must wait until a read has completed (read data returned to the requesting DMA channel), even if the requesting DMA channel has an available local buffer to use.

The maximum number of outstanding read requests that a Requestor may have is dynamic based on the function the Requestor is currently executing. If it is executing a function with low input bandwidth requirements, the limit for the function would be programmed to be a low number of requests. If the requestor is executing a function that has a relatively high input bandwidth requirement, the limit for the function would be programmed to be a higher number of requests. Limits for each function are programmed in advance and dynamically selected based on the current function the requestor is executing.

According to the embodiments, a request arbiter is implemented to ensure fairness in the allocation and access to the shared buffers. The request arbiter uses a round-robin arbitration scheme as between multiple requesting DMA channels servicing different hardware acceleration engines. The arbiter may also use a more complex system of priority signals from the requesting DMA channels to give higher priority to a request where a function engine is starved for data over a request to merely pre-fetch additional data.

Certain hardware accelerator functions require a higher throughput of read data requests than can be accommodated by m local read buffers. To reduce the number of local buffers required, a modification of the first embodiment allows the requestor to make more read requests than it has buffers, up to 2*m requests for m buffers, and the return of read data from the bridge for each request is controlled by the requesting bus agent. When multiple read requests are outstanding for the same requestor read buffer, the read data for the buffer must be returned in order and when the buffer is empty once any previously received data has been forwarded to the hardware acceleration engine. Each buffer read request toggles between one of two buffer IDs, which are part of the read request.

Signals are sent from each requestor to the Read Data Control logic indicating whether the read data associated with that buffer ID can be returned to the requestor. The Read Data Control logic translates the requestor ID and local buffer ID to the ID of (to map to a corresponding) the buffer in the bridge and sends a similar signal to the bridge indicating which read buffers in the Bridge may return read data to the Requestor. When read data returns to the bridge on the system bus, if that buffer is marked as ready to return data, the Bridge will forward the data to the Requestor.

The request arbiter prevents the deadlock that could occur if all Bridge buffers are allocated with "second buffer read requests" that are not ready to have read data returned. When the number of shared buffers that are idle or ready to return read data is less than a threshold limit, the request arbiter signals the requestors to only send read requests that are ready to have read data returned, i.e. there is space available in the associated local buffers.

In another aspect of the embodiments, the outstanding read request limit can be adjusted so that the read data for the second request associated with a requestor read buffer does not occupy the bridge buffer for very long, thereby freeing the buffer to be used by another read request.

Each Requestor has a dedicated set of local buffers that can not be used by other requestors. However, all share the same buffers that are in the bridge. Even though a Requestor may still need to fetch more input data, and has local buffers available to make the request, if the requestor has a relatively lower bandwidth requirement than other processes executing and already has sufficient read requests to satisfy that bandwidth requirement (the programmable limit for the function it is currently executing), the requestor is prevented from making additional read requests that would use more of the limited number of shared buffers available in the bridge. This allows another requestor needing to fetch more input data to satisfy its bandwidth requirements to make use of those available shared buffers.

The DMA engine makes a request to read data within a cacheline boundary and a read request arbiter and control logic arbitrates between multiple coprocessors to pass read requests to the bus bridge logic and moves the read data from cache or system memory to the bridge.

BRIEF DESCRIPTION OF THE SEVERAL VIEWS OF THE DRAWINGS

The embodiments disclosed herein will be better understood from the following detailed description with reference to the drawings, which are not necessarily drawn to scale and in which.

DETAILED DESCRIPTION

The embodiments herein and the various features and advantageous details thereof are explained more fully with reference to the non-limiting embodiments that are illustrated in the accompanying drawings and detailed in the following description.

Figure 1:
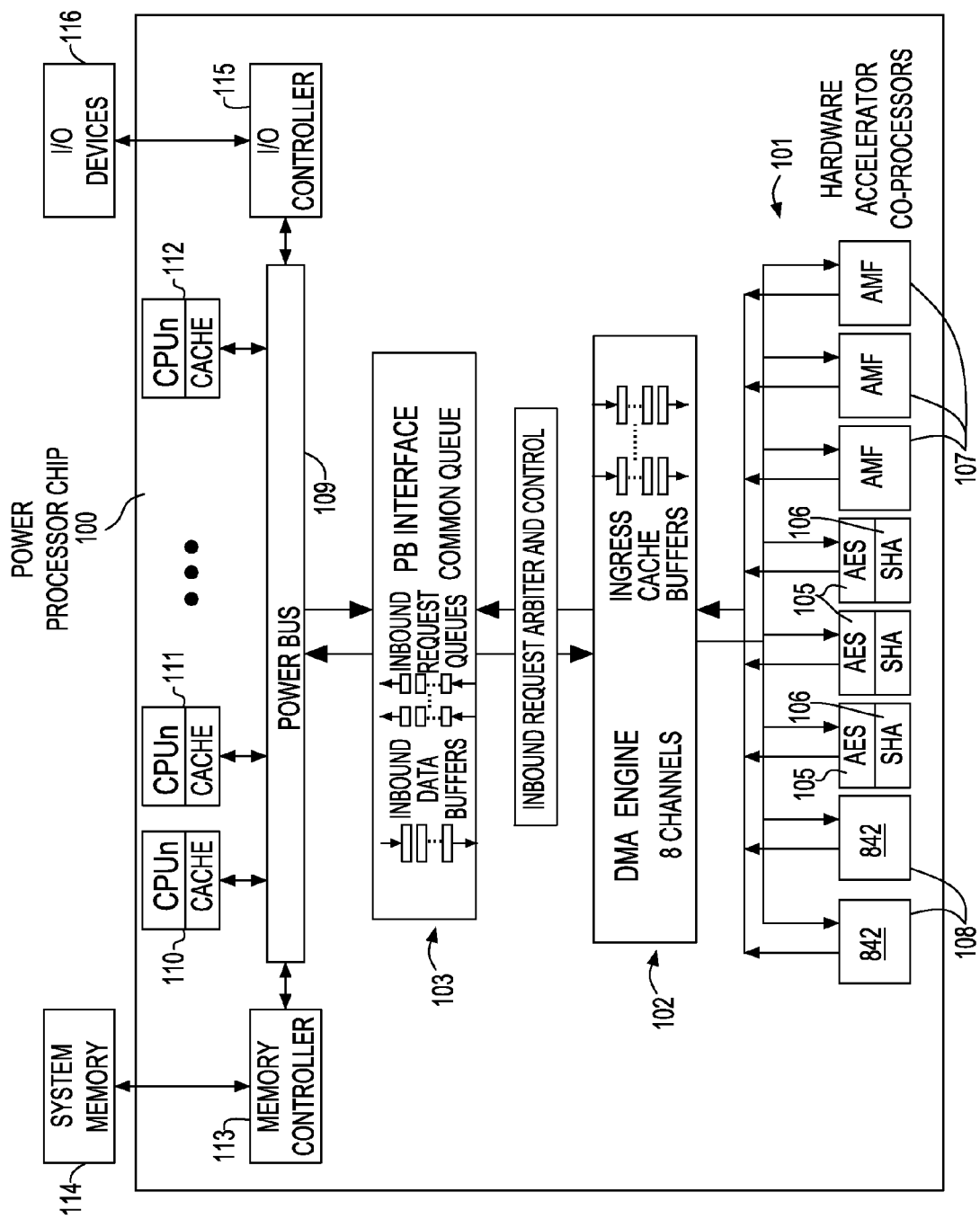
FIG. 1 is a schematic block diagram illustrating an embodiment of a distributed multi-processor computer system having shared memory resources connecting through a bridge agent coupled to a main bus.

An example of a computer architecture employing dedicated coprocessor resources for hardware accleration is the IBM Power Server system. However, a person of skill in the art will appreciate embodiments described herein are generally applicable to bus-based multi-processor systems with shared memory resources. A simplified block diagram of hardware acceleration dataflow in the Power Server System is shown in FIG. 1. Power Processor chip 100 has multiple CPU cores (0-$n$) and associated cache 110, 111, 112 which connect to Power Bus 109. Memory controller 113 provides the link between Power Bus 109 and external system memory 114. I/O controller 115 provides the interface between Power Bus 109 and external I/O devices 116. Power Bus 109 is the bus fabric that facilitiates data, address, and control movement between the various interconnected components.

Coprocessor complex 101 is connected to the Power Bus 109 through a Power Bus Interface (PBI) Bridge 103. ("coprocessor" as used herein, is synonymous with "coprocessor hardware accelerator," "hardware accelerator," "hardware acceleration engine" and like terms.) The bridge contains queues of coprocessor requests received from CPU cores 110, 111, 112 to be issued to the coprocessor complex 101. It also contains queues of read and write commands and data issued by the coprocessor complex 101 and converts these to the appropriate bus protocol used by the System Bus 109. The Coprocessor Complex 101 contains multiple channels of coprocessors, each consisting of a DMA engine and one or more engines that perform the coprocessor functions.

Coprocessor acceleration engines 101 may perform cryptographic functions and memory compression/decompression or any other dedicated hardware function. DMA engine(s) 102 read and write data and status on behalf of coprocessor engines 101. PowerBus Interface (PBI) 103 buffers data routed between the DMA engine 102 and PowerBus 109 and enables bus transactions necessary to support coprocessor data movement, interrupts, and memory management I/O associated with hardware acceleration processing.

Advanced encryption standard (AES) and secure hash algorithm (SHA) cryptograph accelerators 105, 106 are connected pairwise to a DMA channel, allowing a combination AES-SHA operation to be processed moving the data only one time. Asymmetric Math Functions (AMF) 107 Perform RSA cryptography and ECC (eliptical curve cryptography). 842 accelerator coprocessors 108 perform memory compression/decompression. A person of skill in the art will appreciate various combinations of hardware accelerators may be configured in parallel or pipelined without deviating from the scope of the embodiments herein.

In order for the accelerators to perform work for the system, the coprocessor complex 101 must be given work from a hypervisor or virtual machine manager (VMM) (not shown), implemented in software to manage the execution of jobs running on the coprocessor complex 101. A request for coprocessor hardware acceleration is initiated when a coprocessor request command is received by the PBI bridge 103. If a request is successfully enqueued, when a coprocessor is available the job will be dispatched to the DMA engine, i.e., PBI bridge 103 signals DMA engine 102 that there is work for it to perform and DMA engine 102 will remove the job from the head of the job request queue and start processing the request.

DMA engine 102 then assigns the coprocessor request to an appropriate DMA channel connected to the type of coprocessor requested. DMA 102 tells the coprocessor to start and also begins fetching the data associated with the job request.

When the coprocessor has output data or status to be written back to memory, it makes an output request to DMA 102, which moves the data from the coprocessor to local buffer storage and from there to PBI 103 and then to memory. Upon completion, the coprocessor is ready to accept another job request.

TABLE 1

DMA Read Request Configuration Register

| Name | Description |
|---|---|
| Max Per Channel AES/SHA Read Requests | Maximum number of outstanding read requests per channel towards PB<br>0b0000 - invalid value<br>0b001 - 1 request<br>. . . |
| Max Per Channel AMF Read Requests | Maximum number of outstanding read requests per channel towards PB<br>0b0000 - invalid value<br>0b001 - 1 request<br>. . . |
| Max Per Channel 842 Compression or Block Data Move Read Requests | Maximum number of outstanding read requests per channel towards PB<br>0b0000 - invalid value<br>0b001 - 1 request<br>. . .<br>0b1000 - 8 requests |
| Max Per Channel 842 Decompression Read Requests | Maximum number of outstanding read requests per channel towards PB<br>0b0000 - invalid value<br>0b001 - 1 request<br>. . .<br>0b1000 - 8 requests |

Referring to Table 1 above, settings for a configuration register associated with each DMA channel are shown. Each DMA channel services one or more hardware acceleration engines, which may or may not have a similar function. The first entry for Table 1 shows the configuration settings for an advanced encryption standard (AES) and secure hash algorithm (SHA) cryptograph accelerators connected pairwise to a DMA channel, allowing a combination AES-SHA operation to be processed. There are eight valid entries for the configuration register and values outside that range are invalid. A person of skill in the art will appreciate numerous encoding schemes may be devised for configuration settings and are not limited to those implementations shown herein. Asymmetric Math Functions (AMF) perform RSA cryptography and ECC (eliptical curve cryptography) and, similarly, a maximum of eight pending requests is allocated. 842 accelerator coprocessors perform memory compression and decompression and have a configuration register associated with each function and a maximum number of outstanding requests of 15. A person of skill in the art will appreciate various combinations of hardware accelerators may be configured in parallel or pipelined without deviating from the scope of the embodiments herein and lesser or greater pending read data requests may be accommodated.

Figure 2:
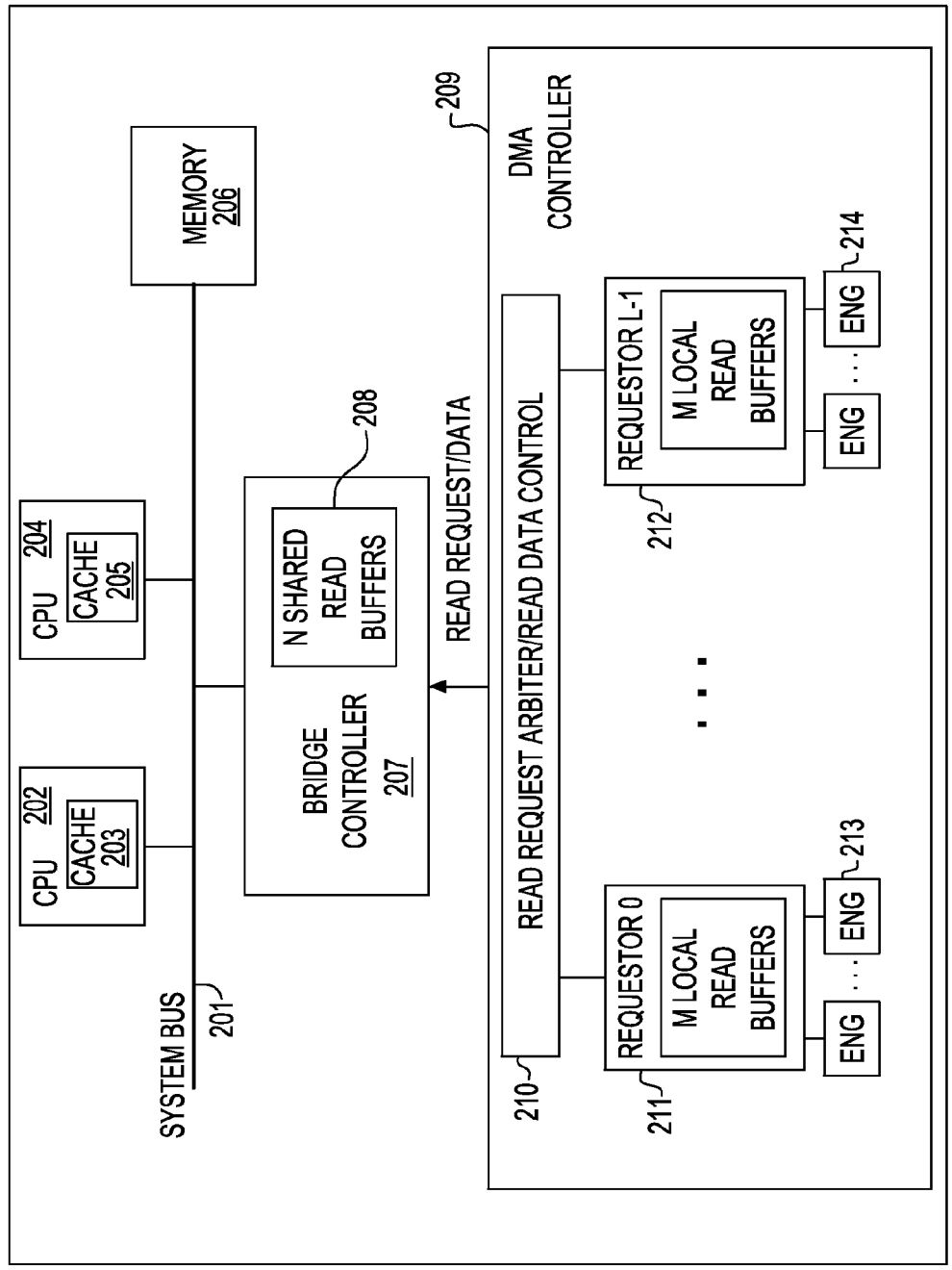
FIG. 2 is a schematic block diagram of a representative view of read data buffering elements in a general multi-processor computer system with shared memory resources and employing hardware acceleration engine coprocessors according to aspects of the present invention.

FIG. 2 shows a block diagram of read data buffering elements in a general multi-processor computer system 200 utilizing shared memory resources 203, 205, 206, 208 and employing hardware acceleration engine coprocessors 213, 214. A system bus 201 provides a data path between a main memory 206, processor cores 202, 204 and bridge controller 207, which facilitates data transfer between system memory 206 or processor cache memory 203, 205 and a DMA controller 209 and ultimately to hardware acceleration engine coprocessors 213 and 214. The bridge controller 207 includes n shared read buffers 208 to temporarily store read data requests and data retrieved from memory or cache. Requestors 0:L−1 send requests through the DMA channel for read data needed for jobs executed by the hardware accelerators. Requestors 211, 212 each include m local read buffers shared between the hardware accelerators 213, 214 connected thereto. A request arbiter and read control element 210 manages the transfer, dependency and priority of read data requests. The shared read buffers 208 in the bridge 207 are managed by read data control logic 210 in the coprocessor DMA control 209.

In embodiments, the coprocessor request block (CRB) is a cache line of data that describes what coprocessor function is being performed and also contains pointers to multiple data areas that are used for input data to the acceleration engine or a destination for output data produced by the acceleration engine as well as reporting final status of the coprocessor operation.

In embodiments, a Coprocessor Parameter Block (CPB) contains an input area used by the engine to configure the operation to be performed and an output area that can be used by the engine to write out intermediate results to be used by another CRB or final results, based on the operation that was performed.

Output data from a coprocessor hardware acceleration engine represents results of the accelerator's calculations on input data. The pointer associated with data output by a coprocessor is the Target Data Descriptor Entry (TGTDDE)—a pointer with a byte count to a single block of data or a list of multiple blocks of data that output data produced by the coprocessor engine will be stored to. TGTDDE behaves similarly to Source Data Descriptor Entry (SRCDDE) though used to write out target data produced by a coprocessor acceleration engine. When the DDE count is non-zero, the stream of target data produced by the coprocessor accelerator engine will be written out using as many target DDEs from the list as needed, going through the list sequentially.

Inbound read data requests are initiated by the DMA channel controllers (requestors 211, 212) to fetch coprocessor CPB data, source data, and both target and source DDE's. A round-robin priority scheme is used to arbitrate between multiple channels making requests. The number of pending requests for read data is limited by the number n shared read buffers in the bridge.

The channel controller (requestor 211 and 212) makes a request and provides the starting address of the requested read data, number of bytes requested—the combination of which should not exceed a single cacheline. The requestor identifies the destination within the DMA controller to which the data should be returned, which may include a DDE register or a cacheline buffer belonging to that requestor. Once a buffer becomes available, the destination of the request is ready to accept returned data. The requestor also indicates whether it will receive an entire cacheline or merely a half word.

The request arbiter 210 will choose one of the idle bridge buffers 208 in the bridge 207 to use for the read data request. The arbiter associates the bridge buffer with a channel controller and the destination for that channel controller and forwards the request to the bridge controller 207.

To prevent a deadlock, at least one of n read requests sent to the bridge controller 207 must be able to have data returned to DMA 209. When the number of shared buffers that are idle or enabled to return read data to the DMA 209 is less than a threshold, the request arbiter signals the requestors to only send read requests that are ready to have read data returned. The bridge 207 makes the read request on the system bus 201 and buffers the data when it is returned. The requestors 211, 212 indicate to the DMA inbound read control logic 209 which of their cacheline buffers are ready to accept read data. There are multiple bits per cacheline buffer; one for each possible outstanding request that uses that cacheline buffer. According to embodiments, there are a maximum of two requests per buffer. Only the bit corresponding to the oldest request for a buffer can be asserted as data for a buffer must be loaded in the order it was requested. A person of skill in the art will appreciate that additional embodiments may specify a higher or lower number of requests per buffer and non-FIFO buffering schemes.

The DMA Inbound Read Control Logic 210 maps the buffer ready signals from the channel controller requestors 211, 212 into buffer read enable signals to the bridge 207 that indicate which of n read requests are ready to have data returned to DMA 209 (i.e., not a second read request for an ingress cacheline buffer). The bridge 207 will choose one of its n shared buffers 208 that contains data and the read enable from DMA is asserted for and return that data to DMA 209 at either 128 bits (for DDE data) or 256 bits (data to cacheline buffers) per cycle until all of the requested data has been sent to DMA 209. After the data has been transferred to the destination, the bridge buffer holding the read data is available again to be used for another read request.

Figure 3:
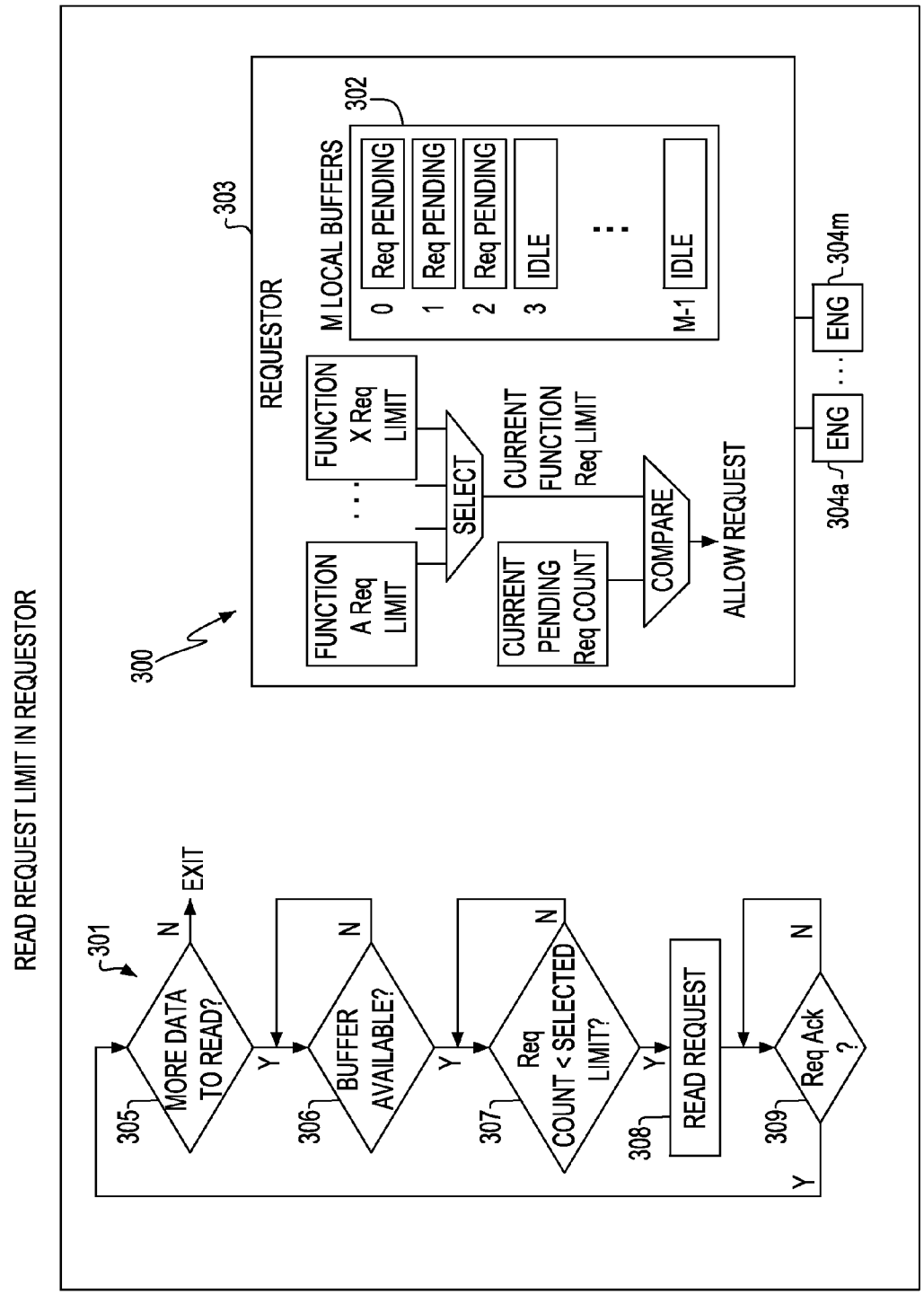
FIG. 3 is a schematic block diagram and abbreviated flow chart illustrating logic elements of a requesting bus agent and the steps taken to limit the number of outstanding read data requests for a coprocessor hardware accelerator engine according to a first embodiment.

With reference to a first embodiment, FIG. 3 shows a schematic block diagram and abbreviated flow chart illustrating logic elements and process steps to limit the number of outstanding read data requests for a requesting bus agent. Requestor logic 300, associated with a dedicated DMA channel, services one or more hardware acceleration engine coprocessors 304a-304m and provides local buffers 302 from 0 to m−1 to hold a cache line of data received from the bridge controller 207 and stores status bits indicating whether the local buffer 302 is idle or holds valid data. The local buffers will also indicate status of whether a request for read data is pending to the bridge controller 207. The requests are serviced in a first-in-first-out (FIFO) manner, such that no request or data is transmitted out of order. However, those of skill in the art will appreciate a variety of ordering schemes and priority functions may be implemented to service requests out of order. The requestor may service hardware accelerators with the same function or those having different functions. In this regard, requestor logic 300 contains configuration registers 303 associated with the hardware accelerators serviced by the requestor setting the maximum number of outstanding read requests allowable for the corresponding hardware accelerator.

Still referring to FIG. 3, a partial flow 301 of the requestor logic is shown. Read data may be fetched on a cacheline basis or in a larger format. The requestor logic parses the needed read data requests into whatever framing convention is used and issues a sufficient number of requests to receive the required input source data. If no further read data is required 305 then the process ends. Otherwise, the requestor logic checks to see if a local buffer within the requestor is available 306 to receive the requested data from the bridge. If not the system waits until a local buffer frees up to accept data from the bridge. The requestor logic next determines whether the number of pending requests for read data associated with this hardware accelerator is less than a selected limit 307. If not, the system again waits until one or more pending data requests are serviced before sending the request to the bridge 308. Finally, the requestor logic issues a request signal to the bridge which will reply with an acknowledge 309 when the request is forwarded to the bridge and the process repeats.

Figure 4:
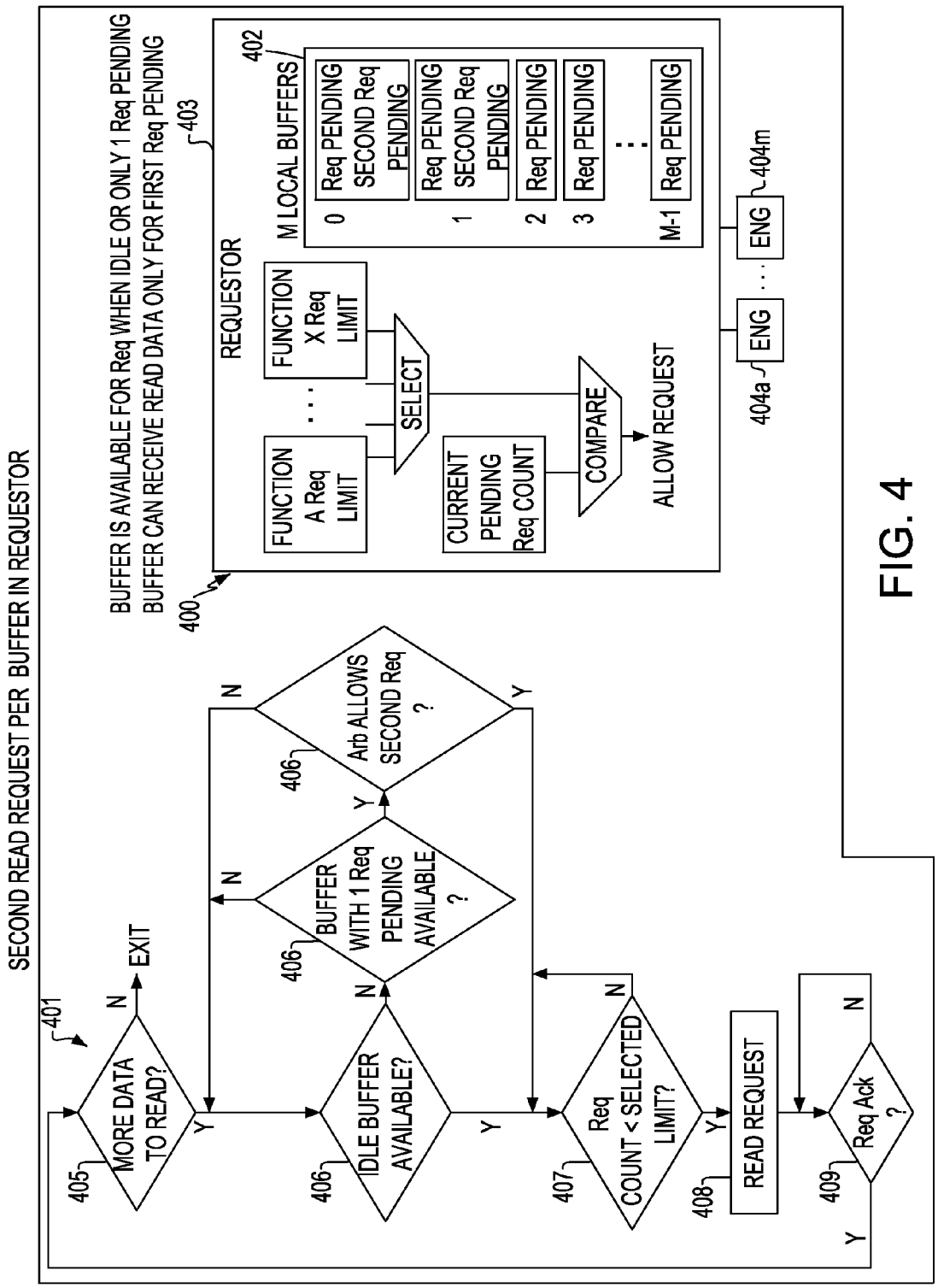
FIG. 4 is a schematic block diagram and abbreviated flow chart illustrating logic elements and steps taken to limit the number of outstanding read data requests for a coprocessor hardware accelerator engine according to a second embodiment.

In accordance with a second embodiment, FIG. 4, also shows a schematic block diagram 400 and abbreviated flow chart 401 illustrating logic elements and process steps to limit the number of outstanding read data requests for a requesting bus agent. Requestor logic 400 is identical to the first embodiment shown in FIG. 3, with the exception of the m local buffers 402 indicating a maximum of two pending requests per local buffer for read data per hardware acceleration engine 404$a$-$m$. As in the first embodiment, requests for read data must come back in order. Accordingly, the results of the first request must be forwarded to the requesting hardware accelerator 404$a$-$m$ prior to the second request being serviced.

The process steps 401 associated with a second read request per buffer are shown in the partial process flow in FIG. 4. The requestor first determines if more read data is required 405. The requestor then checks whether an idle local buffer is available 406. If an idle local buffer is available, the requestor determines whether the request count is within the prescribed limit 407, which is based on the function being executed. If within the limit, the read request is forwarded to the bridge controller 408 and the system waits for an acknowledge signal 409 from the arbiter 210 and the process repeats. While an idle local buffer remains unavailable, the requestor logic 300 checks whether there is a local buffer available with a single pending request. If yes, the requestor logic checks whether the arbiter 210 is allowing a second request to be pending or not depending on the number of buffers in the bridge 207 that are enabled to send data back to the requestors or are idle. If a buffer with one request pending is not available or if the arbiter 210 disallows enqueuing of a second request the requestor waits for an additional buffer to become available.

Figure 5:
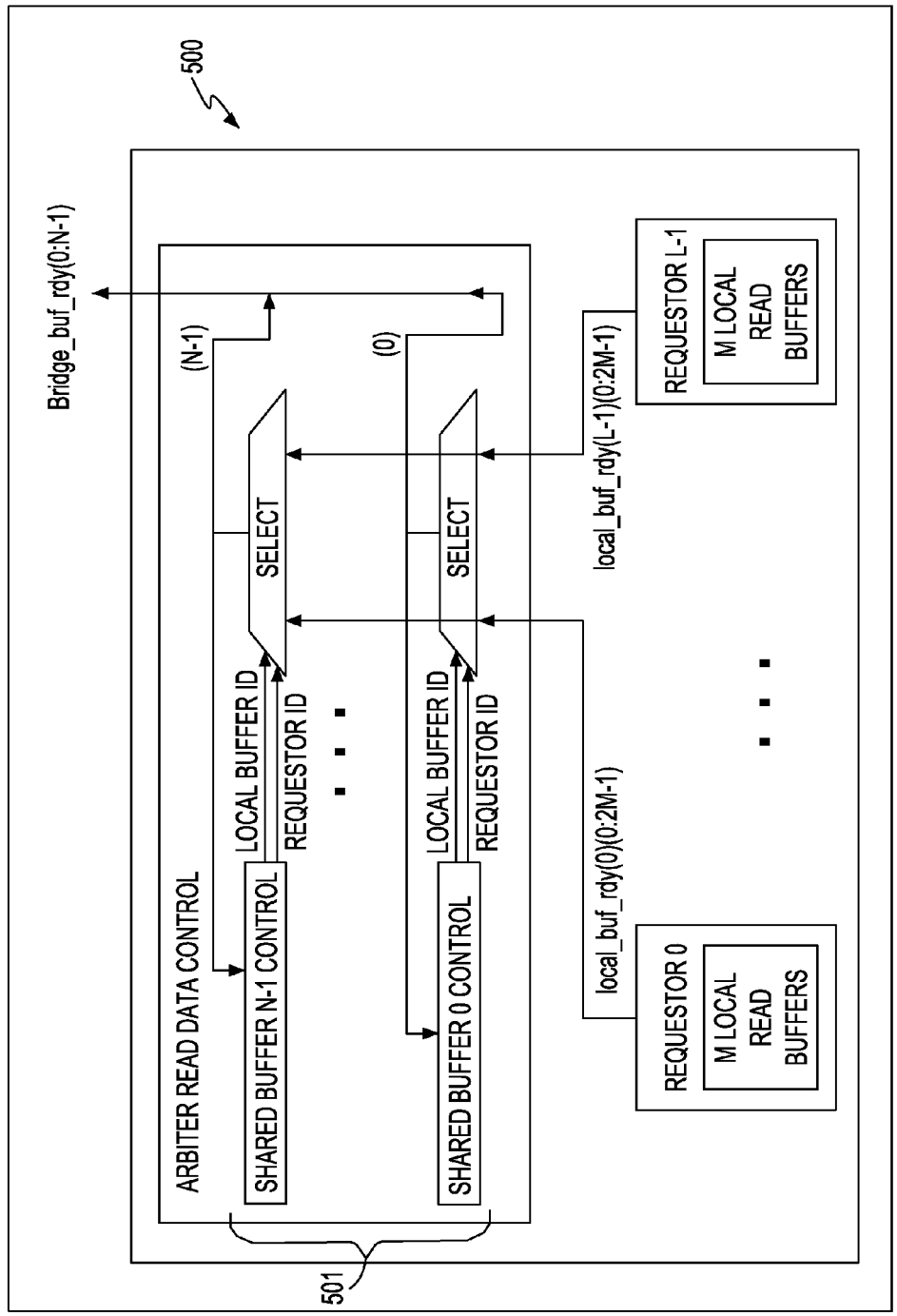
FIG. 5 shows a block diagram of read data control logic to facilitate the pacing of read data between a bridge controller and a requesting bus agent.

Referring to FIG. 5, control logic 500 for read data pacing from bridge 207 to a requestor according to a second embodiment is shown. When a read request is assigned to a shared buffer, the requestor ID (0:L−1) and local buffer ID (0:2m−1) information from the request is stored in a control register 501. Shared buffer control registers 0:n−1 provide requestor ID (0:L−1) and local buffer ID (0:2m−1) information to select mux logic, which forwards a buffer ready signal to the bridge 207. The select mux logic provides the same buffer ready signal back to the shared buffer control registers to reflect which requestor and corresponding local buffer are ready to receive the requested read data. The buffer ready signal is encoded with some percentage of the total buffer space represented as a virtual buffer, which allows the system to accommodate more read requests than available local buffers due to the latency associated with the data and request being propagated between the bridge and the requestor control logic. In FIG. 5, the ratio is shown as 2:1 because the indexing notation of the loc_buf_rdy signal indicates 0:2m−1 or twice the m local buffers. The latency of read requests sent to the bridge to read data available in a bridge buffer will determine the extent to which a set of local buffers may need to be oversubscribed. In other words, having a portion of the local read buffers of a single requestor represented as additional virtual buffers enables the system to accommodate more pending read data requests, allowing higher read data bandwidth without incurring the cost of additional physical local buffers.

Figure 6:
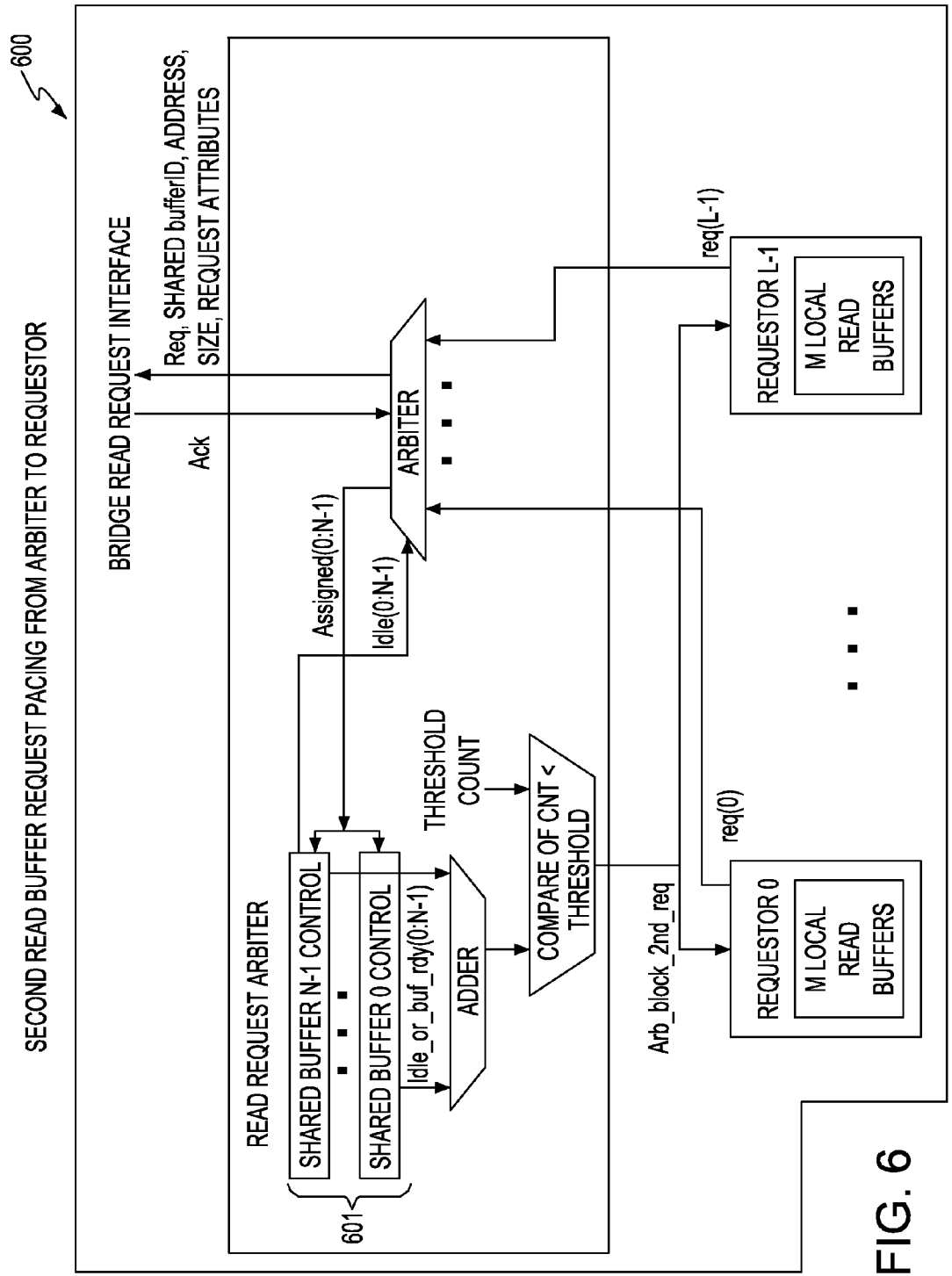
FIG. 6 shows a block diagram of read control logic to facilitate a second read buffer request from an arbiter to a requesting bus agent.

Referring to FIG. 6, read data control logic for a requestor issuing a second request for read data according to a second embodiment is shown. The read data control logic manages read data requests from requestors 0:(L−1) and maintains status registers for all of the shared buffer resources residing in the bridge controller. The idle or buf_rdy(0:N−1) signals are output from the status registers. This signal indicates a buffer is either idle or ready to receive data from the shared bridge buffers. These signals are summed in an accumulator and the result is compared with a threshold count. The comparator issues a block signal Arb-block_$2^{nd}$_req to the requestors, if the accumulator value is less than the threshold limit. The purpose of the Arb-block_$2^{nd}$_req signal is to prevent the condition where all shared bridge buffers have been allocated with second read requests that are not able to receive data from the bridge buffers, causing a stall condition. When the signal is asserted, the requestors are prohibited from making requests that are not ready to accept read data, however, the requestors may still make requests that are ready to accept read data.

An arbiter 210 receives requests for read data from requestors 0:(L−1) and forwards the selected request, using a round-robin arbiter, to the lowest numbered idle bridge buffer to the bridge controller interface. The arbiter 210 sends a signal to each of the shared buffer status registers (0:N−1) as to whether it is assigned to a specific read data request. The shared buffer status registers also communicate idle status to the arbiter, which provides the basis for which the next request is selected to be forwarded to the bridge controller interface, which subsequently issues an acknowledge signal back to the arbiter.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

It should further be understood that the terminology used herein is for the purpose of describing the disclosed embodiments only and is not intended to be limiting. As used herein, the singular forms "a", "an" and "the" are intended to include the plural forms as well, unless the context clearly indicates otherwise. It should further be understood that the terms "comprises" "comprising", "includes" and/or "including", as used in this specification, specify the presence of stated features, integers, steps, operations, elements, and/or components, but do not preclude the presence or addition of one or more other features, integers, steps, operations, elements, components, and/or groups thereof. Additionally, it should be understood that the corresponding structures, materials, acts, and equivalents of all means or step plus function elements in the claims below are intended to include any structure, material, or act for performing the function in combination with other claimed elements as specifically claimed. The description above has been presented for purposes of illustration and description, but is not intended to be exhaustive or limited to the embodiments in the form disclosed. Many modifications and variations to the disclosed embodiments will be apparent to those of ordinary skill in the art without departing from the scope and spirit of the disclosed embodiments.

What is claimed is:

1. In a multi-processor computer system having a hierarchical bus architecture facilitating transfer of data between a plurality of agents coupled to the bus, a method of managing access to shared buffer resources in a bridge controller, comprising: defining a limit of pending read data requests for a bus agent requesting read data, 1 to m, where m equals the number of buffers in the requesting bus agent; waiting until a read operation completes once the number of pending read data requests reaches the limit prior to fetching additional read data for the requesting bus agent; and employing a round-robin arbitration scheme to ensure the shared memory resources are not dominated by a first requesting bus agent, such that no executing process of a second bus agent stalls for lack of read data.

2. The method according to claim 1, wherein the request arbiter uses a round-robin arbitration scheme to service multiple read data requests based on the type of request.

3. The method according to claim 1, wherein, the pending read data requests comprise pre-fetching additional read data or fetching required data for an executable process serviced by one of the plurality of bus agents.

4. The method according to claim 1, wherein the round-robin arbitration scheme further comprises establishing priority for pending read data requests based on the type of function executing and ensures fairness among requesting bus agents in acquiring access to the shared buffer resources.

5. The method according to claim 1, wherein the arbitration scheme further comprises mapping a first signal to a high priority request where a requesting agent has not completed an executing process for lack of additional read data.

6. The method according to claim 1, wherein completion of read data comprises returning read data to the requesting bus agent.

7. The method according to claim 1, wherein the shared buffer resources reside in a bridge controller.

8. The method according to claim 1, wherein the limit of allowable read data requests is directly proportional to the data throughput requirements of the executing function corresponding to the requesting bus agent.

9. The method according to claim 1, further comprising allocation a plurality of shared read data buffers among multiple read requestors based on their processing bandwidth requirements.

10. The method according to claim 1, further comprising dynamically restricting the number of outstanding read requests a requestor may have based on a temporal bandwidth requirement of the function it is performing.

11. The method of claim 1, further comprising increasing effective read buffering in a requesting bus agent by exploiting the shared buffer resources in the bridge.

12. The method of claim 1, further comprising controlling a return of read data from the shared buffer resources through the requesting bus agent.

13. In a multi-processor computer system, a method of managing read data requests from a plurality of bus agents, comprising: polling whether a first bus agent needs data to execute a function; checking whether an idle local buffer is available if additional read data is required and terminating processing if no additional data is required; determining whether there currently is a local buffer with one read data request pending if no idle local buffer is available; waiting until a local buffer is idle if no local buffer with one read data request pending is available, allowing a second pending read request to proceed if a local buffer has one read data request pending, monitoring whether the number of pending read data requests for the first bus agent is less than a defined limit; processing the read data request of the first bus agent when the number of pending read data requests for the first bus agent is less than the defined limit; and determining whether there are additional read data requests after the request has been acknowledged.

14. A requesting bus agent, comprising: a plurality of local buffers to store read data used by one of a plurality of hardware accelerator engines coupled to the requesting bus agent; and read request selection logic, comprising: a plurality of registers to store an allocated read request limit for a plurality of executable functions serviced by the requesting bus agent, wherein the allocated read request limit is determined by a hardware accelerator function serviced by the requesting bus agent; a first multiplexer to select one of the plurality of registers, a current pending request register, and a comparator having inputs from the first multiplexer and the pending request count register to select a next allowed read data request.

15. A method of managing a read data request issued from a requesting bus agent, comprising: determining whether a first requesting bus agent has a pending read data request; if yes, monitoring whether an idle buffer is available if additional read data is required, else terminating processing if no additional data is required; monitoring whether a request count for the first bus agent is less than a defined limit; processing the read request for the first bus agent if the request count for the first bus agent is less than the defined limit; and determining whether there are additional read data requests after the read data request has been acknowledged.

16. A read data controller to manage a flow rate of read data from a bridge controller to a requesting bus agent, comprising: a plurality of registers to monitor and communicate busy and idle status of a plurality of shared buffers; and a plurality of multiplexors each operatively coupled to a corresponding one of the plurality of registers to select one read data request and pass the request to the bridge controller.

17. A read request arbiter to manage arbitration between a plurality of read requestors requiring use of a plurality of shared read buffers in a bridge, comprising: a plurality of registers for controlling utilization of the plurality of shared buffers; an adder operatively coupled to the plurality of registers to receive signals from the plurality of registers indicating whether each one of the plurality of shared buffers are idle or enabled to return read data; a comparator coupled to the adder to monitor whether the number of shared buffers idle or enabled to return read data is less than a defined threshold, the comparator outputting a signal to a plurality of bus agent requestors to prevent requests by one of the plurality of read requestor not ready to receive data; and an arbiter to receive and manage requests for read data from the plurality of bus agent requestors and forward to a bridge controller based on idle and busy states of the shared buffers.

18. A multi-processor computer system with shared memory resources, comprising: a bus to facilitate transfer of address and data between multiple agents coupled to the bus; a plurality of multi-processor nodes, each node having one or more processor cores connected thereto; a memory subsystem associated with each one of the plurality of multi-processor nodes;
  a local cache associated with each one of the one or more processor cores; a bridge controller facilitating transfer of data between shared memory resources, wherein the bridge controller includes a set of shared read data buffers used for read requests to memory; a plurality of coprocessor hardware accelerators, each coprocessor hardware accelerator having one or more dedicated processing functions and a configuration register to record settings for read request limits; a direct access memory (DMA) controller to manage data flow to and from the plurality of coprocessor hardware accelerators; and a plurality of local read buffers associated with each one of the plurality of coprocessor hardware accelerators.

19. The system according to claim 18 wherein the read request limit for the number of outstanding read requests is contained in the requestor.

\* \* \* \* \*